(12) United States Patent
Cohen

(10) Patent No.: US 7,190,444 B1
(45) Date of Patent: Mar. 13, 2007

(54) SYSTEM AND METHOD OF MEASURING FIELD-OF-VIEW OF AN OPTICAL SENSOR

(75) Inventor: Douglas L. Cohen, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 378 days.

(21) Appl. No.: 10/862,240

(22) Filed: Jun. 7, 2004

(51) Int. Cl.
*G01B 11/26* (2006.01)

(52) U.S. Cl. .................... 356/138; 356/213; 356/218; 342/351

(58) Field of Classification Search ............... 356/138, 356/213, 218; 342/351, 52–54, 191, 179, 342/21, 194–197, 424, 378
See application file for complete search history.

(56) References Cited

U.S. PATENT DOCUMENTS

| | | |
|---|---|---|
| 4,724,439 A | 2/1988 | Wiley et al. |
| 5,243,351 A * | 9/1993 | Rafanelli et al. ........... 342/351 |
| 6,259,396 B1 | 7/2001 | Pham et al. |
| 6,627,893 B1 | 9/2003 | Zeng et al. |

OTHER PUBLICATIONS

Avinash C. Kak et al., "Principles of Computerized Tomographic Imaging", IEEE Press, New York, 1988, pp. 49-57.

* cited by examiner

*Primary Examiner*—Hoa Pham
*Assistant Examiner*—Tri Ton
(74) *Attorney, Agent, or Firm*—RatnerPrestia

(57) ABSTRACT

A method of measuring a field-of-view (FOV) of an optical sensor includes the steps of: (a) uniformly illuminating a FOV of the optical sensor; (b) moving, at an angle of motion, a slit across the FOV and illuminating the optical sensor through the slit; (c) measuring an optical response of the sensor through the slit, at evenly spaced positions of the moving slit; (d) changing the angle of motion and repeating steps (b) and (c); (e) repeating step (d) for equally spaced angles of motion; and (f) constructing a two-dimensional map of the FOV of the optical sensor, after completing step (e). Constructing the two-dimensional map of the FOV includes filtering the measured data using a filtered back-projection algorithm, and interpolating among the filtered measured data to form the two-dimensional map.

18 Claims, 13 Drawing Sheets

SYSTEM AND METHOD OF MEASURING FIELD-OF-VIEW OF AN OPTICAL SENSOR

TECHNICAL FIELD

The present invention relates, in general, to measuring the field-of-view of an optical sensor and, more specifically, to a system and method of measuring the field-of-view of an optical sensor using a filtered backprojection algorithm.

BACKGROUND OF THE INVENTION

An optical instrument has an optical response that varies as a function of its azimuth and elevation viewing angles from a centered coordinate system. As such, an important characteristic of the instrument is the optical response of the instrument within its field-of-view (FOV). Although two instruments may be built to the same specification, each instrument may have a different optical response. Each instrument, therefore, is individually tested to measure optical response as a function of its FOV, or, stated differently, tested to measure its FOV.

There are many methods of measuring an instrument's FOV. Most is methods require setting up a grid of spot measurements. A grid of spot measurements requires a two-dimensional grid of evenly spaced points, positioned in an area intercepting the FOV of the instrument. Collimated beams are sent into the instrument, at positions corresponding to the spots on the grid. The response of the instrument to each beam is recorded, forming a set of information describing the instrument's FOV.

For many types of optical instruments, setting up a grid of spot measurements is adequate. Although the setup may require a large number of grid points and a large number of collimated beams to measure the FOV, the task may be done in a reasonable amount of time provided that each grid point can be measured quickly. Since the quality of the measurement depends on the number of photons, or the amount of light, in the collimated beam, the setup must include collimated beams that are strong enough to permit each grid point to be measured quickly.

Providing strong collimated beams for each grid point is not practical, when measuring the FOV of a spectrometer, for example. It is desirable for the collimated beams to exhibit a specified spectrum and include relatively weak collimated beams at some wavelength of the frequency spectrum. These weak collimated beams require a relatively long period of time to collect a sufficient amount of photons. Thus, the FOV measurement also requires a long period of time.

A need exists for a method of measuring a FOV of an optical instrument, device, or sensor, that may be performed in a much shorter period of time than those required by conventional measurement methods. The present invention addresses such need.

SUMMARY OF THE INVENTION

To meet this and other needs, and in view of its purposes, the present invention provides a method of measuring a field-of-view (FOV) of an optical sensor including the steps of: (a) uniformly illuminating a FOV of the optical sensor; (b) moving, at an angle of motion, a slit across the FOV and illuminating the optical sensor through the slit; (c) measuring an optical response of the sensor through the slit, at evenly spaced positions of the moving slit; (d) changing the angle of motion and repeating steps (b) and (c); (e) repeating step (d) for equally spaced angles of motion; and (f) constructing a two-dimensional map of the FOV of the optical sensor, after completing step (e). Constructing the two-dimensional map of the FOV includes filtering measured data obtained in step (e) using a filtered backprojection algorithm, and interpolating among the filtered measured data to form the two-dimensional map of the FOV. Constructing the two-dimensional map of the FOV may also include forming a grid of values corresponding to the measured optical response of the sensor at the evenly spaced positions of the moving slit and the equally spaced angles of motion, and interpolating on the grid to find a value of the FOV at a point on the optical sensor. Interpolating on the grid includes estimating the value of the FOV at the point given by coordinates x, y using adjacent values formed on the grid. Interpolating on the grid may also include estimating the value of the FOV at the point given by coordinates x, y, using adjacent values formed on the grid, as a function of evenly spaced angles between zero radians and pi radians.

In another embodiment, the present invention provides a method of measuring a field-of-view (FOV) of an optical sensor having circular symmetry, the method including the steps of: (a) uniformly illuminating a FOV of the optical sensor; (b) moving a slit across the FOV and illuminating the optical sensor through the slit; (c) measuring an optical response of the sensor through the slit, at evenly spaced positions across the FOV; and (d) constructing a two-dimensional map of the FOV of the optical sensor, after completing step (c). Step (b) includes moving the slit across the FOV in a single direction only. Constructing the two-dimensional map of the FOV includes forming a grid of values corresponding to the measured optical response of the sensor at the evenly spaced positions along the single direction, and interpolating on the grid to find a value of the FOV at a point on the optical sensor. Interpolating on the grid includes estimating the value of the FOV at the point given by coordinates x, y using adjacent values formed on the grid. Interpolating on the grid may also include estimating the value of the FOV at the point given by a distance r from the origin of coordinates x, y using adjacent values formed on the grid, as a function of evenly spaced angles between zero radians and pi radians.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
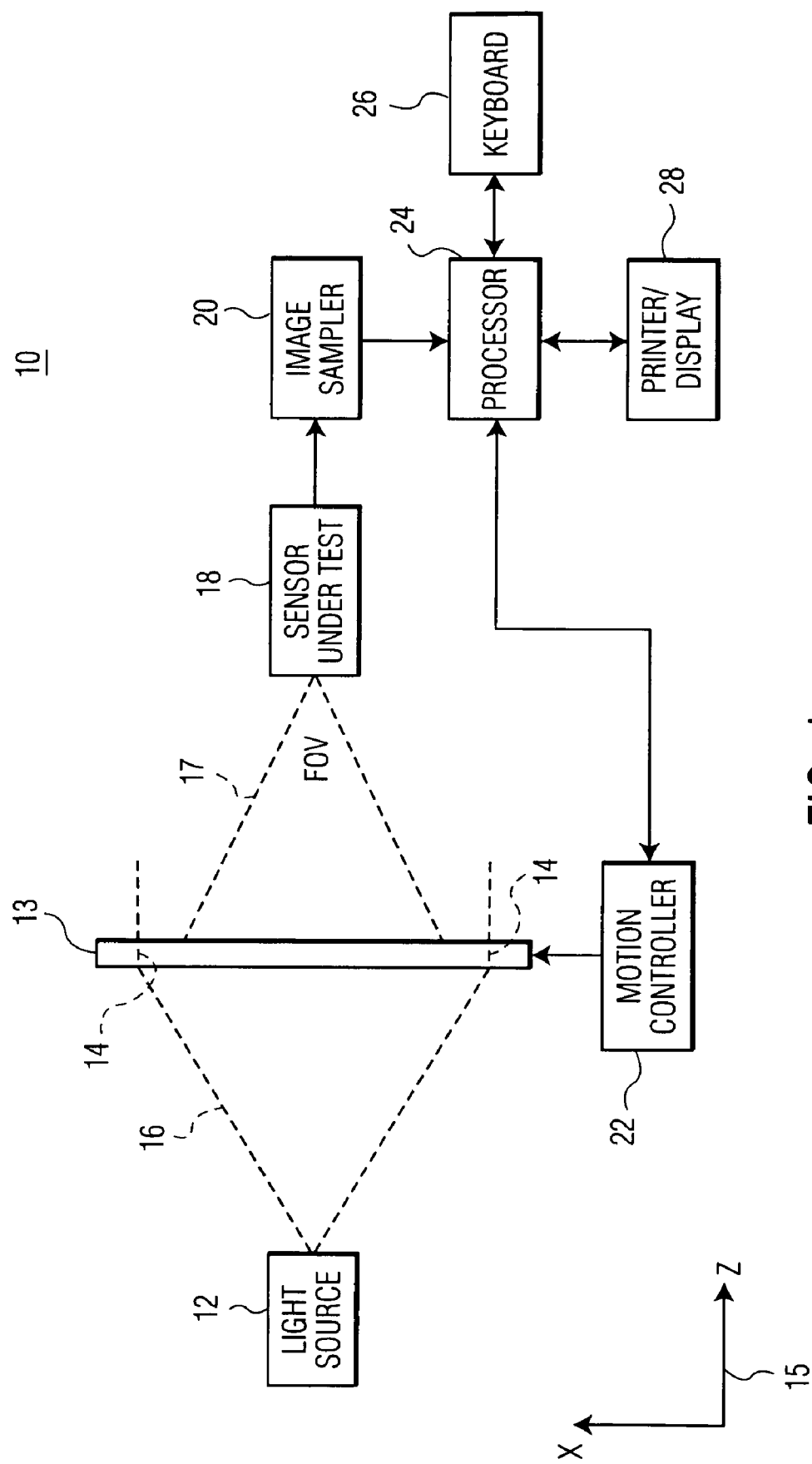
FIG. 1 is a schematic block diagram of a system for measuring a field-of-view (FOV) of an optical sensor, in accordance with an embodiment of the present invention.

Referring to FIG. 1, there is shown system 10 for measuring a field-of-view (FOV) of an optical sensor, in accordance with an embodiment of the present invention. As shown, system 10 includes light source 12, slotted plate 13, an optical instrument, device, or sensor under test 18, image sampler 20, processor 24, keyboard 26, printer/display 28 and motion controller 22.

Figure 4:
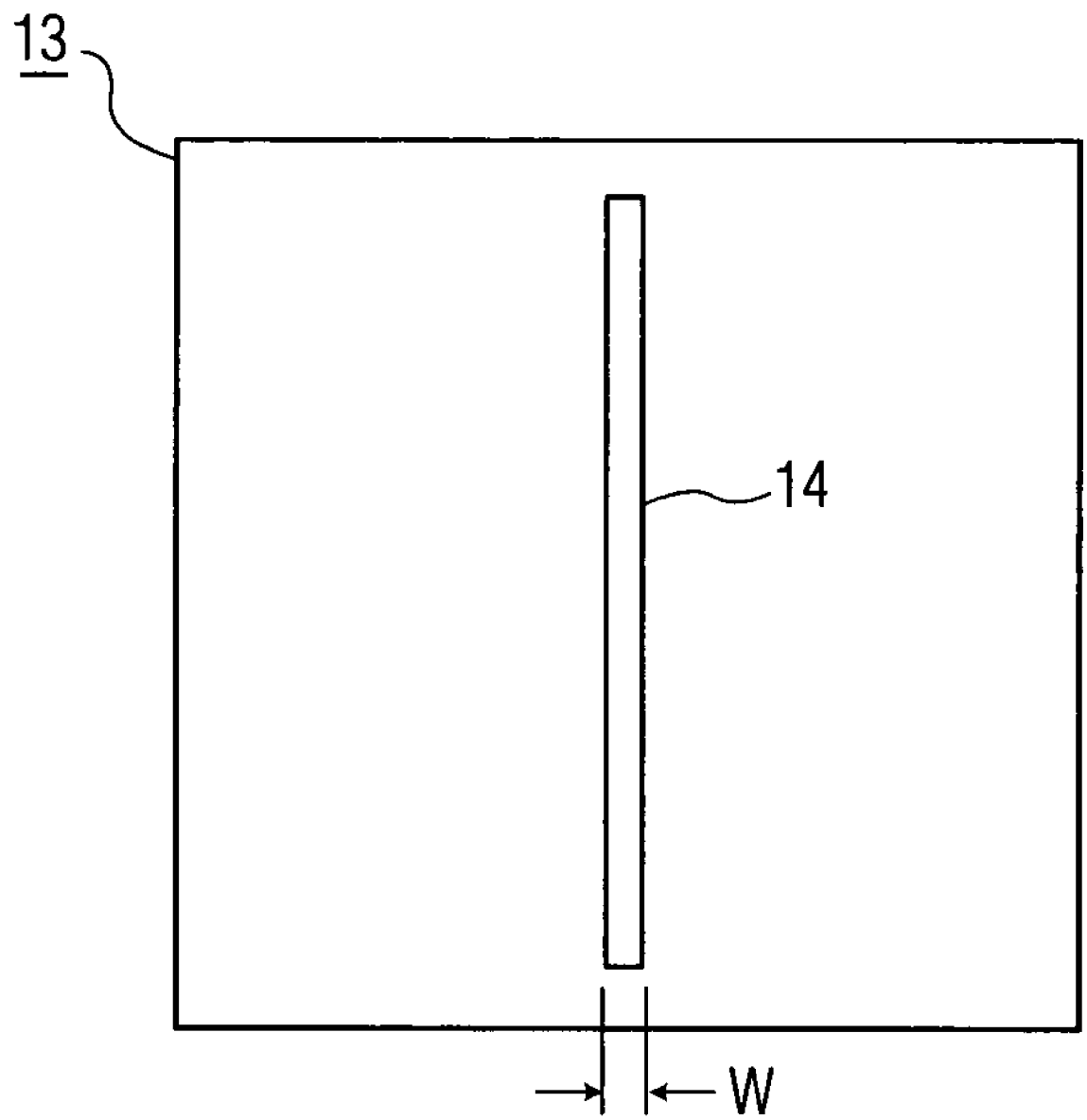
FIG. 4 is a schematic representation of a vertical slit (or slot) embodied in a plate of the system shown in FIG. 1, in accordance with an embodiment of the present invention.

Light source 12 may include any source of light providing a collimated beam 16 with a uniform intensity in an X,Y plane of an X,Y, Z coordinate system. Light beam 16 is emitted toward the optical instrument under test, or optical sensor 18. Disposed between light source 12 and optical sensor 18 is slotted plate 13. As best shown in FIG. 4, slotted plate 13 includes an elongated narrow vertical slot, or slit 14, for permitting passage of portions of light beam 16 through slotted plate 13. Portions of light beam 16 passing through slit 14 are sensed by optical sensor 18, if the light beam is within the FOV of the sensor. The FOV of the sensor, generally designated as 17, is shown as an X,Z plane of the X,Y,Z coordinate system.

It will be appreciated that slotted plate 13 may be formed of any material which is opaque to transmission of light. The light sensed by optical sensor 18 is preferably due only to the light passing through slit 14. The length of slit 14 in the X direction is preferably made greater than the length of the FOV in the X direction covered by optical sensor 18, as shown in FIG. 1. In this manner, the light passing through the slit may cover the entire FOV of optical sensor 18 in one dimension (length), as the slit is moved in any direction perpendicular to that one dimension (length).

The response of optical sensor 18 is measured, as slit 14 passes portions of light beam 16 to the optical sensor. As will be explained, motion controller 22 is configured to move slotted plate 13 transversely to its longitudinal slit 14. For example, the longitudinal slit may be moved in an X,Y direction of the X,Y,Z coordinate system 15, as shown in FIG. 1, where the Z axis is disposed along the light beam propagation direction.

As the slit is moved across the FOV, the optical response of the sensor under test is measured by image sampler 20 and processor 24. The processor, which may be user controlled by way of keyboard 26, as shown, may print or display the response of sensor 18 to the light. This response may be printed or displayed as a two-dimensional map of the FOV in the X,Y axes (for example) on printer/display 28. In the exemplary embodiment of FIG. 1, processor 24 provides translation directions to slotted plate 13, in order to move slit 14 in X and Y directions, which are directions perpendicular to the Z direction.

The manner in which the slit is moved across the FOV of the optical sensor will now be described by reference to FIG. 2. For purpose of clarity, only slit 14 is shown in the figure, without also showing slotted plate 13 that actually forms slit 14.

As shown, the slit is moved completely across FOV 16. The optical response is measured at evenly spaced sample positions, as shown by the slit shapes with the solid lines. After completing the run for one scan direction across the FOV, the angle of motion is changed and a similar run is executed to scan in a different direction across the FOV, as shown by the slit shapes with dashed lines. The angle θ is one of a series of equally spaced angles between 0 degrees and 180 degrees. As shown, the angle θ is formed between a line formed along one scan direction of a run and another line formed along another scan direction of another run. Each of the lines formed along a scan direction is perpendicular to the longitudinal dimension of slit 14.

The present invention provides a method for measuring the optical response of the sensor under test by gathering FOV information or data over a series of runs. Each run provides sensor response data along evenly spaced sample positions along one scan direction t. The series of runs is formed by a sequence of individual scan directions that are each separated by an equally spaced angle θ between 0 degrees and 180 degrees.

Because the slit admits more light toward the sensor than a grid-point measurement set-up, the present invention advantageously gathers information similar to information gathered by the grid-point measurement set-up, but completes the measurements in a much shorter time period. The slit admits much more light than a spot, thereby allowing the slit measurements to be completed in a much shorter time period than an equivalently detailed setup of grid-points.

Figure 2:
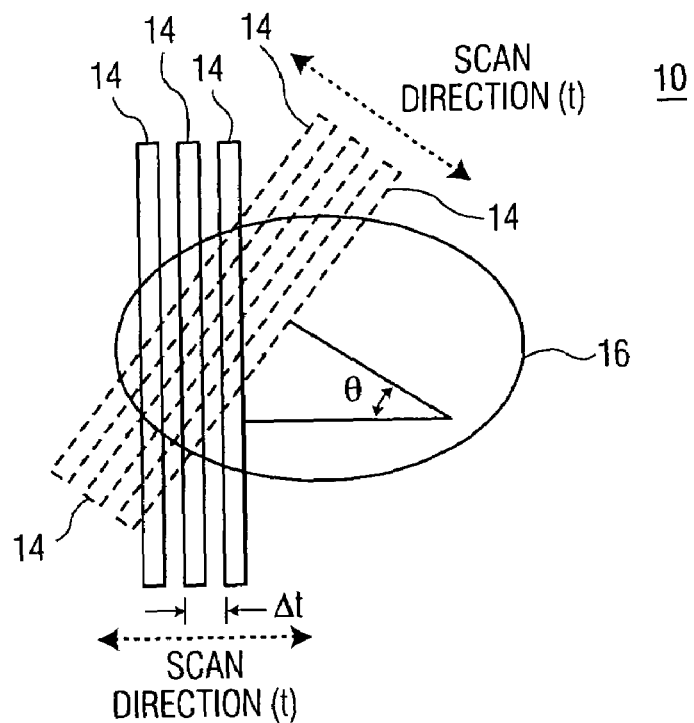
FIG. 2 is a schematic diagram of a moving vertical slit, utilized by the system shown in FIG. 1, as the slit is moved in various scanning directions (t), at various scan angles (θ), and covers the FOV of the optical center, in accordance with a method of the present invention.
Figure 3:
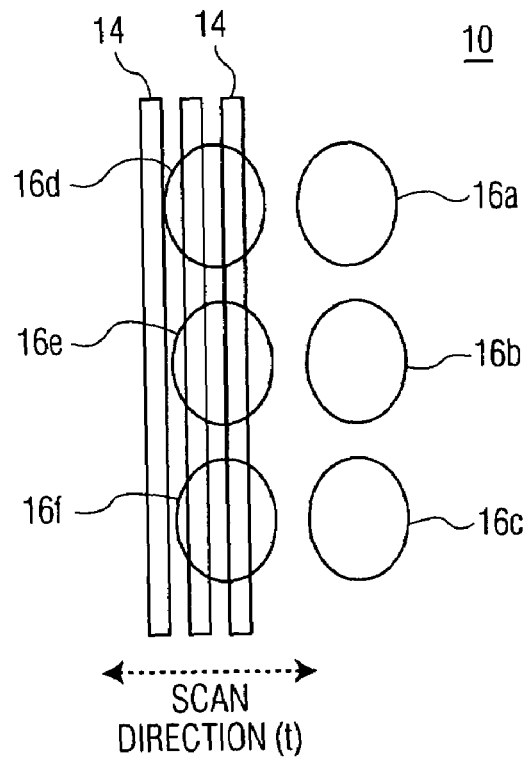
FIG. 3 is a schematic diagram of a moving vertical slit, utilized by the system shown in FIG. 1, moving in a scan direction, t, and uniformly and simultaneously illuminating multiple FOVs of an array of sensors, in accordance with another embodiment of the present invention.

Another embodiment of the invention, as shown in FIG. 3, system 10 is conducting FOV measurements by simultaneously stimulating multiple FOVs of a large array of closely spaced sensors. As shown, the array of sensors includes six closely spaced FOVS, designated as 16a, 16b, 16c, 16d, 16e and 16f. Vertical slit 14 is moved, for example, in a horizontal scan direction of t, where θ=0 degrees. In this manner, system 10 may cover and sample three of the six FOVs (for example) at the same time. This advantageously allows the FOV measurements to take place more quickly than the FOV measurements being conducted in the exemplary embodiment of FIG. 2.

Similar to the embodiment shown in FIG. 2, the invention shown in FIG. 3 measures the optical response of an array of sensors by gathering FOV information over a series of runs. Each run provides sensor response data along evenly spaced sample positions along one scan direction t. The series of runs is formed by a sequence of individual scan directions that are each separated by an equally spaced angle θ between 0 degrees and 180 degrees. It will be appreciated that only one run is shown in FIG. 3, as taken in one scan direction t, at an angle of θ=0 degrees. Changes in the angle θ for each scan direction may be similar to those shown in FIG. 2.

Turning next to the various algorithms executed by the present invention, use of a Radon transform will now be described. The methods of the invention utilize the Radon transform to construct a two-dimensional map of the FOV of a sensor under test. More specifically, the present invention uses a filtered backprojection algorithm to obtain the two-dimensional map of the FOV.

Application of a filtered backprojection algorithm to the slit scan data gathered by system 10 will now be described. The slits used to gather data have width w, as shown in FIG. 4. In a single scan, at just one angle, there are $N_k$ measurements taken at evenly spaced slit locations along the scan. Adjacent measurements are separated by an interval $\Delta t$, as shown in FIG. 2.

The k'th slit measurement occurs at position coordinate $t_k$ along the scan direction, with $t_{k+1} = t_k + \Delta t$. There are $N_j$ scans at evenly spaced angles between 0 degrees and 180 degrees. Adjacent scans are separated by a change in angle $\Delta\theta$ in radians. The j'th scan occurs at angle $\theta_j$, with $\theta_{j+1} = \theta_j + \Delta\theta$.

A quantity $h_k$ is defined by the invention as follows:

$$h_k = \begin{cases} 0 & \text{when } k = \pm 2, \pm 4, \pm 6, \ldots \\ -1/(k\pi\Delta t)^2 & \text{when } k = \pm 1, \pm 3, \pm 5, \ldots \\ 1/(2\Delta t)^2 & \text{when } k = 0 \end{cases}$$

$P_{j,k}$ is defined as a value of the k'th slit measurement along the scan direction, at the j'th angle. Index k runs from 0 to $N_k-1$ and index j runs from 0 to $N_j-1$. Quantity $h_k$ is used by the invention to calculate a new array of values, as follows:

$$Q_{j,k} = \frac{\Delta t}{w} \sum_{i=0}^{N_k-1} P_{j,i} h_{k-i}$$

Next, a set of $N_\phi$ evenly spaced angles between 0 degrees and 180 degrees is specified. In general, $N_\phi$ is preferably larger than $N_j$. The spacing between these angles is as follows:

$$\Delta\phi = \pi/(N_\phi - 1)$$

The spacing between these angles is in radians.

The $N_\phi$ angle values are specified in radians by the following formula:

$$\phi_i = i\Delta\phi \text{ for } i = 0, 1, 2, \ldots, N_\phi - 1$$

A function $q(\phi, t)$ is constructed by the invention by linearly interpolating on the grid of $Q_{j,k}$ values. To calculate $q(\phi, t)$, the index values j and k are first found, as follows:

$$t_k \leq t < t_{k+1} \text{ and } \theta_j \leq \phi < \theta_{j+1}$$

The following expression is then used by a method of the invention:

$$q(\phi, t) = (1-v)(1-u)Q_{j,k} + v(1-u)Q_{j+1,k} + vuQ_{j+1,k+1} + (1-v)uQ_{j,k+1}$$

where $$v = \frac{\phi - \theta_j}{\theta_{j+1} - \theta_j} = \frac{\phi - \theta_j}{\Delta\theta} \text{ and } u = \frac{t - t_k}{t_{k+1} - t_k} = \frac{t - t_k}{\Delta t}$$

The value of the field-of-view (FOV) at the point given by coordinates x,y in angle space, defined as f(x,y), is then given by $$f(x, y) = \frac{\pi}{N_\phi - 1} \sum_{i=1}^{N_\phi - 2} q(\phi_i, x\cos(\phi_i) + y\sin(\phi_i)) +$$

-continued $$\frac{1}{2} \frac{\pi}{N_\phi - 1} [q(\phi_0, x\cos(\phi_0) + y\sin(\phi_0)) + (\phi_{N_\phi - 1}, x\cos(\phi_{N_\phi - 1}) + y\sin(\phi_{N_\phi - 1}))]$$

Figure 5:
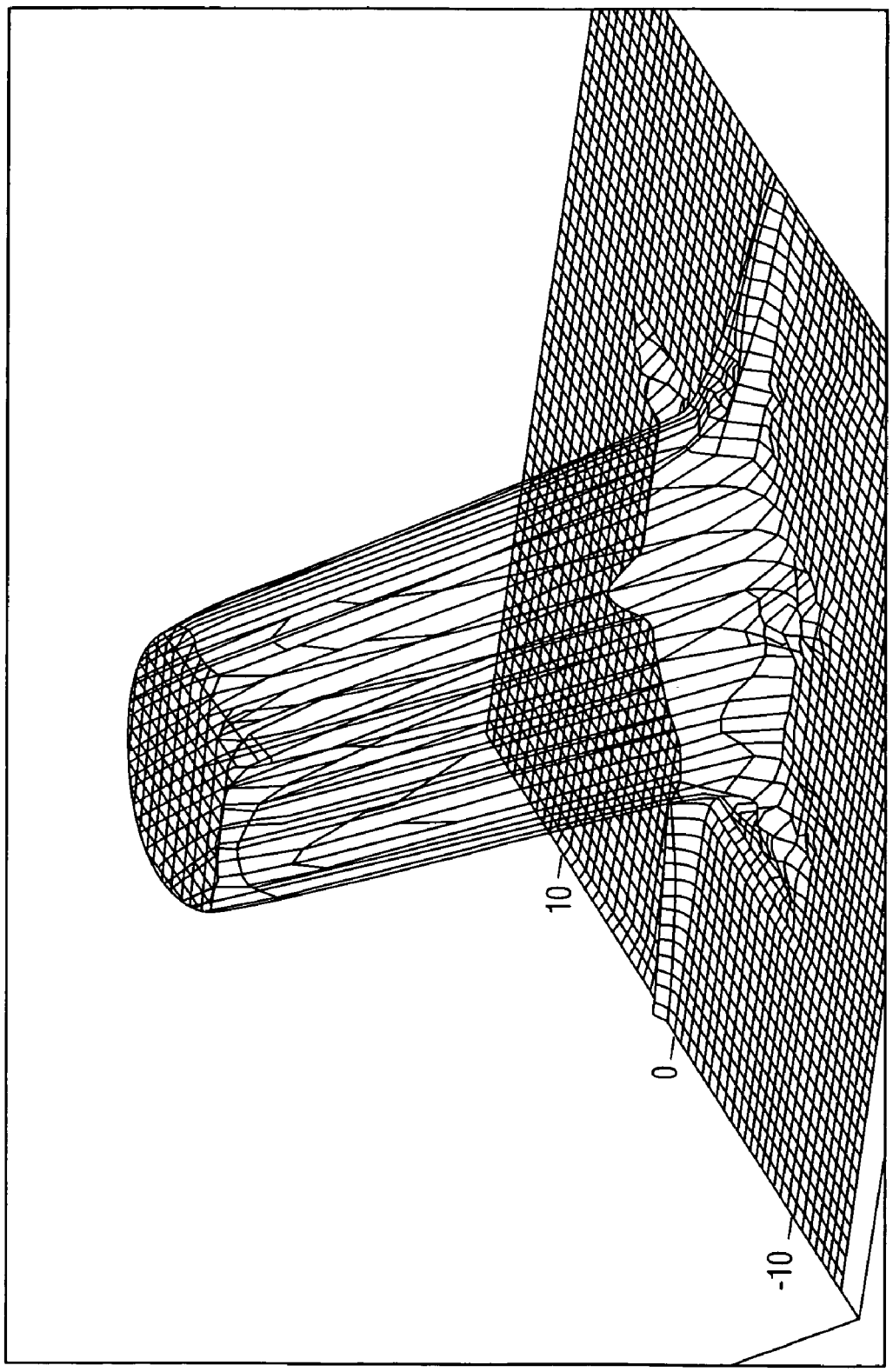
FIG. 5 is a two-dimensional map of an exemplary FOV of an optical sensor, in accordance with an embodiment of the present invention.

FIG. 5 is an exemplary map showing two-dimensional FOV data constructed by system 10, after applying the filtered backprojection algorithm described above. The slit width w is about 1% of the length of FOV 16 at the angle of $\theta$ equal to 0, as shown for example in FIG. 2. There are, for example, 80 evenly spaced angle scans, of 100 slit measurements each, which are processed by the filtered backprojection algorithm to produce the map shown in FIG. 5.

It will be understood that the method described above may be applied to the measurement of any FOV of any optical sensor. Any sensor (not just a spectrometer, camera or other type of imager) having a defined FOV may be stimulated through a longitudinal narrow slit, data sampled, and processed to quanitfy its FOV by this procedure.

Figure 6A:
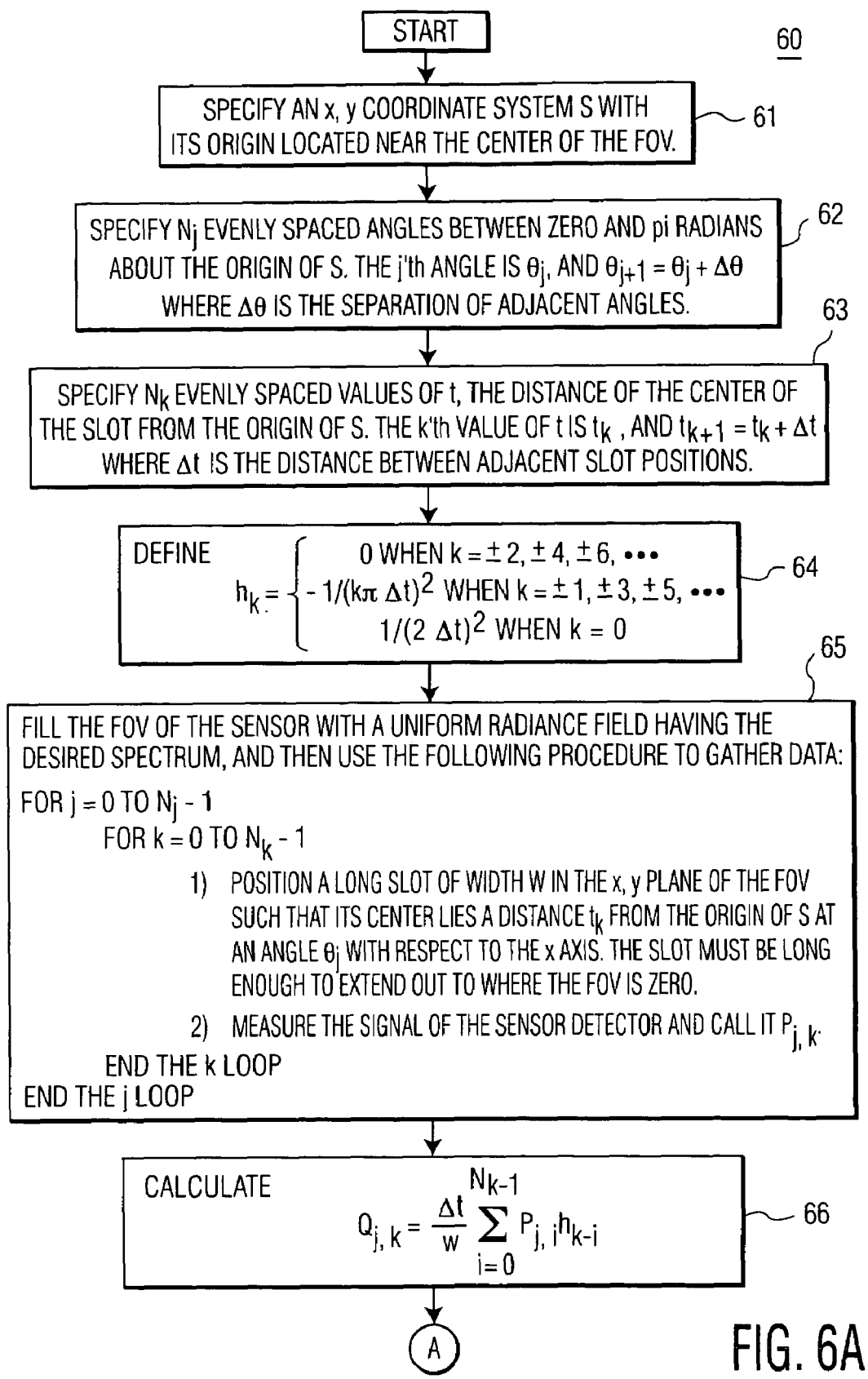
FIGS. 6A, 6B and 6C are flow diagrams of an embodiment of a method of the present invention, utilizing the system of FIG. 1, to measure the FOV of the optical system under test.
Figure 6B:
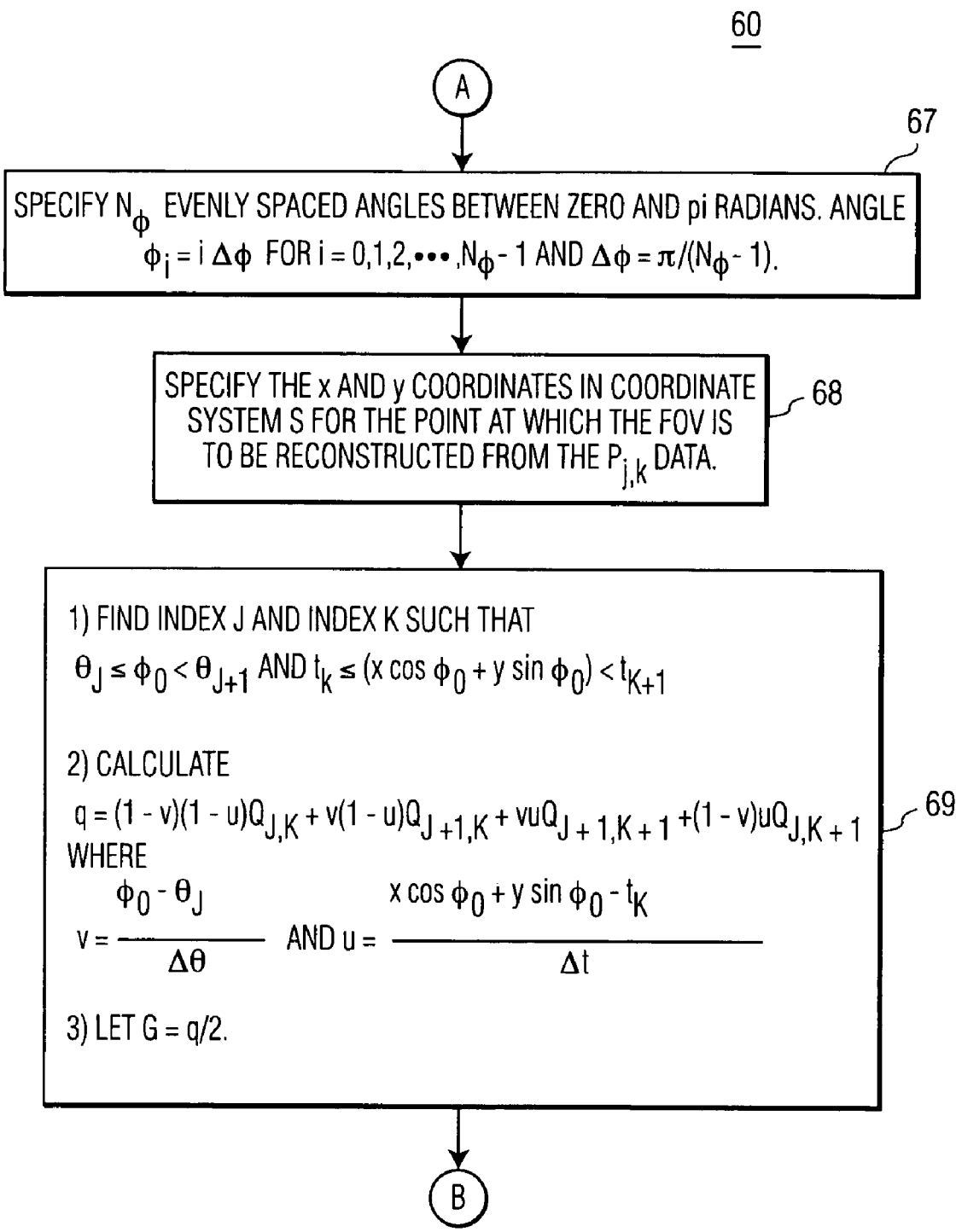
Figure 6C:
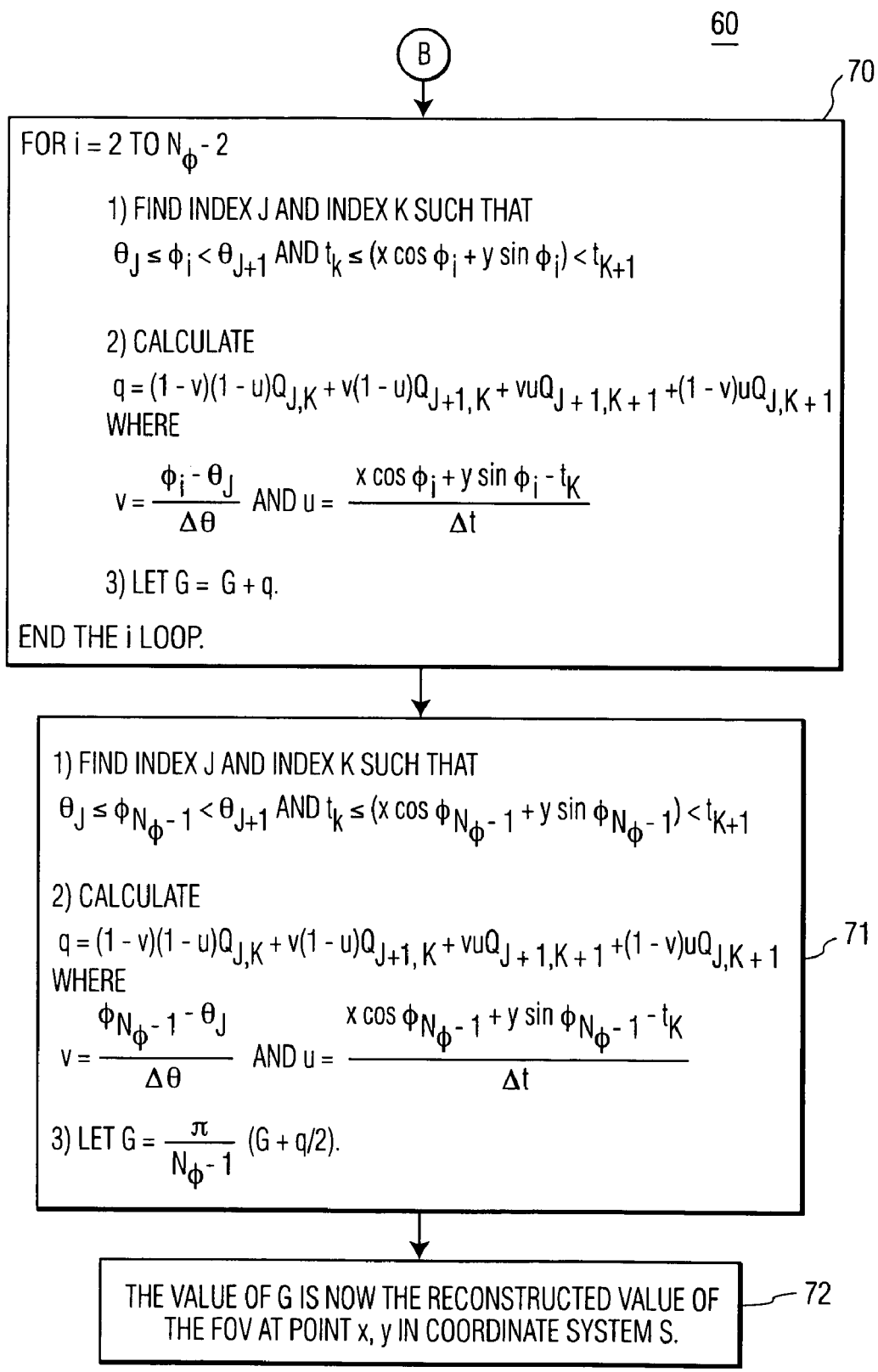

Referring to FIGS. 6A, 6B and 6C, there is shown an exemplary method of measuring a FOV of an optical sensor, the method generally designated as 60. The method, beginning at step 61, specifies an X,Y coordinate system having an origin located near a center of the field-of-view. The coordinate system is designated as S.

The method, in step 62, specifies evenly spaced angles between 0 radians and pi radians. These evenly spaced angles are separated by $\Delta\theta$. Step 63 of the method specifies evenly spaced distances for moving the slit (or slot) along a specific angle. $\Delta t$ is the separation distance between adjacent slit positions.

After the evenly spaced angles are specified and the evenly spaced distances of the slit are specified, the method in step 64, defines a filtering function designated as $h_k$. As shown in FIG. 6A, $h_k$ takes on different values depending on the value of the integer k. The value of k may be positive or negative, as the distances of the slit (or slot) may be positioned in a positive direction or a negative direction, about a centered origin in coordinate system S.

In step 65, the method provides a light source having a uniform radiance field with a desired spectrum. The spectrum may include a wide range of wavelengths, such as the wide range provided by a black body, or the spectrum may include a narrow or specific wavelength. The uniform radiance preferably covers the FOV of the sensor. Continuing step 65, the method positions the longitudinal slot, having a width of w, in an X,Y plane of the FOV, such that the center of the slot is disposed at a distance $t_k$ from the origin of the coordinate system, at an angle of $\theta_j$ with respect to the X axis.

It will be appreciated that the longitudinal slot is preferably long enough to extend out to a point where the FOV of the optical sensor is zero. After the slot is positioned at this distance and angle, the light passing through the slot is detected by the optical sensor as a signal. The signal detected by the optical sensor is measured and denoted by a value of $P_{j,k}$. The method continues re-positioning the longitudinal slot, at equally spaced distances from the origin of the coordinate system, along the t scanning direction. This re-positioning is repeated for a complete count of the values of k, from k=0 to $N_k-1$. A different value of $P_{j,k}$ is measured for every re-positioning of the slot along a fixed direction. In other words, the j value stays fixed, while the value of k is varied from k=0 to $N_k-1$.

Still continuing the description of step 65, the method re-positions the longitudinal slot for scanning along another direction t at a different angle of $\theta_j$. The angle of $\theta_j$ is changed at evenly spaced angles between 0 radians and pi radians. In performing the outer loop shown in step 65, the method varies the value of j from j=0 to $N_j-1$ until all measurements have been completed, as a function of various angles positioned evenly between 0 radians and pi radians.

The signals detected by the optical sensor are measured in this manner and filtered by the $h_k$ filter, defined in step 64. The step of filtering the detected optical sensor signals is performed, as shown by step 66, to provide a grid of filtered values, each filtered value denoted by $Q_{j,k}$.

Referring next to FIGS. 6B and 6C, the method interpolates among the grid of filtered values to form a two-dimensional map of the FOV. The interpolation is performed by steps 67, 68, 69, 70, 71 and 72.

The interpolation is calculated to find an X,Y value of the FOV in the coordinate system of S. The interpolation is performed by using evenly spaced angles between 0 radians and pi radians, where each angle is denoted by $\phi_i$. The interpolation is calculated among four adjacent points on the grid of filtered values, which have been calculated in step 66. As the four adjacent points on the grid have different values of j and k, the method finds the index j and the index k such that the equations shown in steps 69, 70 and 71 are satisfied.

The method is completed by step 72, where each value of G is now the reconstructed (or interpolated) value of the FOV of the optical sensor, at point X,Y in coordinate system S. The algorithm executed by method 60, as exemplified by FIGS. 6A, 6B and 6C, may also be referred to as a modified filtered backprojection algorithm.

Figure 7A:
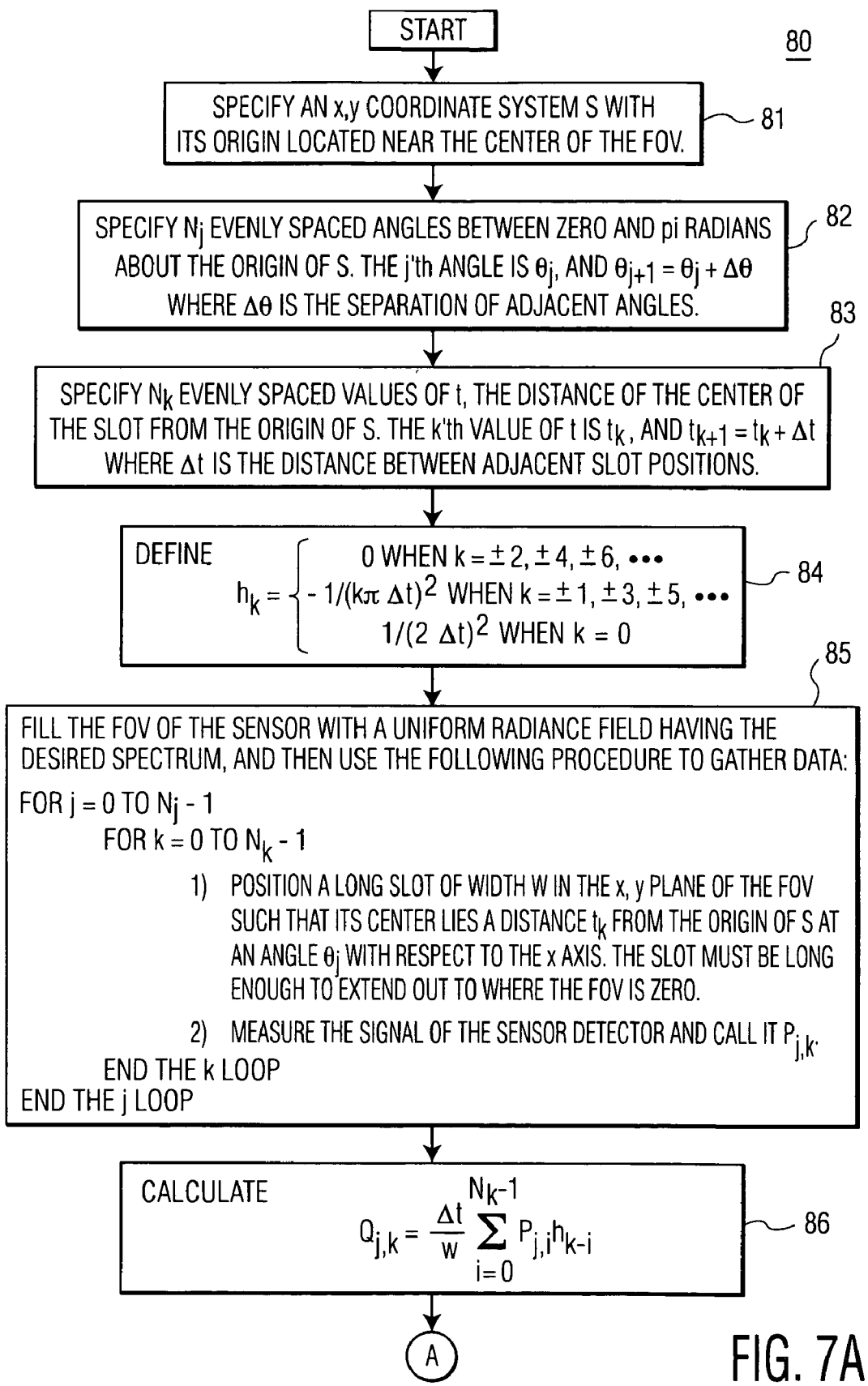
FIGS. 7A, 7B and 7C are flow diagrams of another embodiment of a method of the invention, utilizing the system of FIG. 1, to measure the FOV of the optical system under test.
Figure 7B:
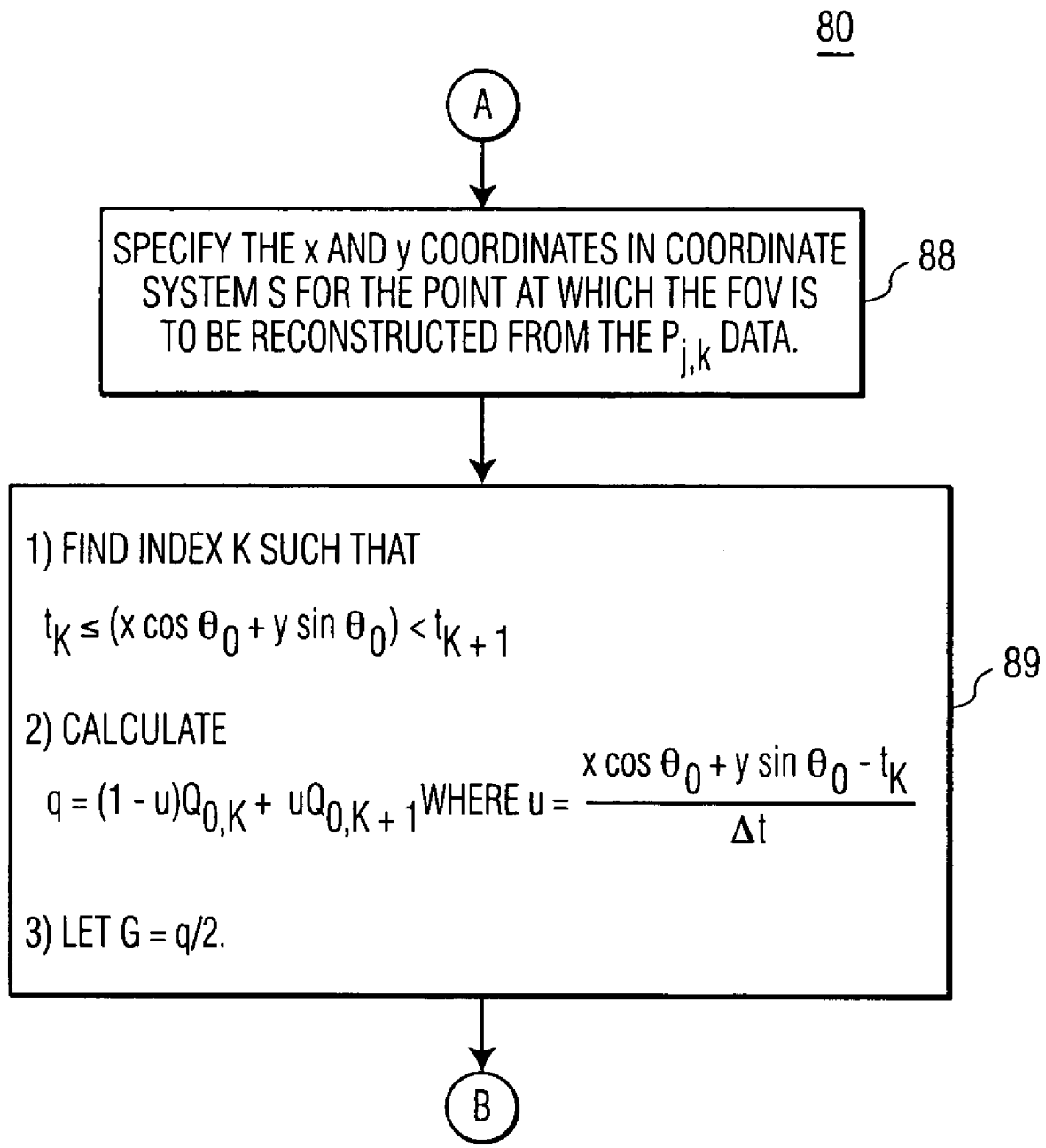
Figure 7C:
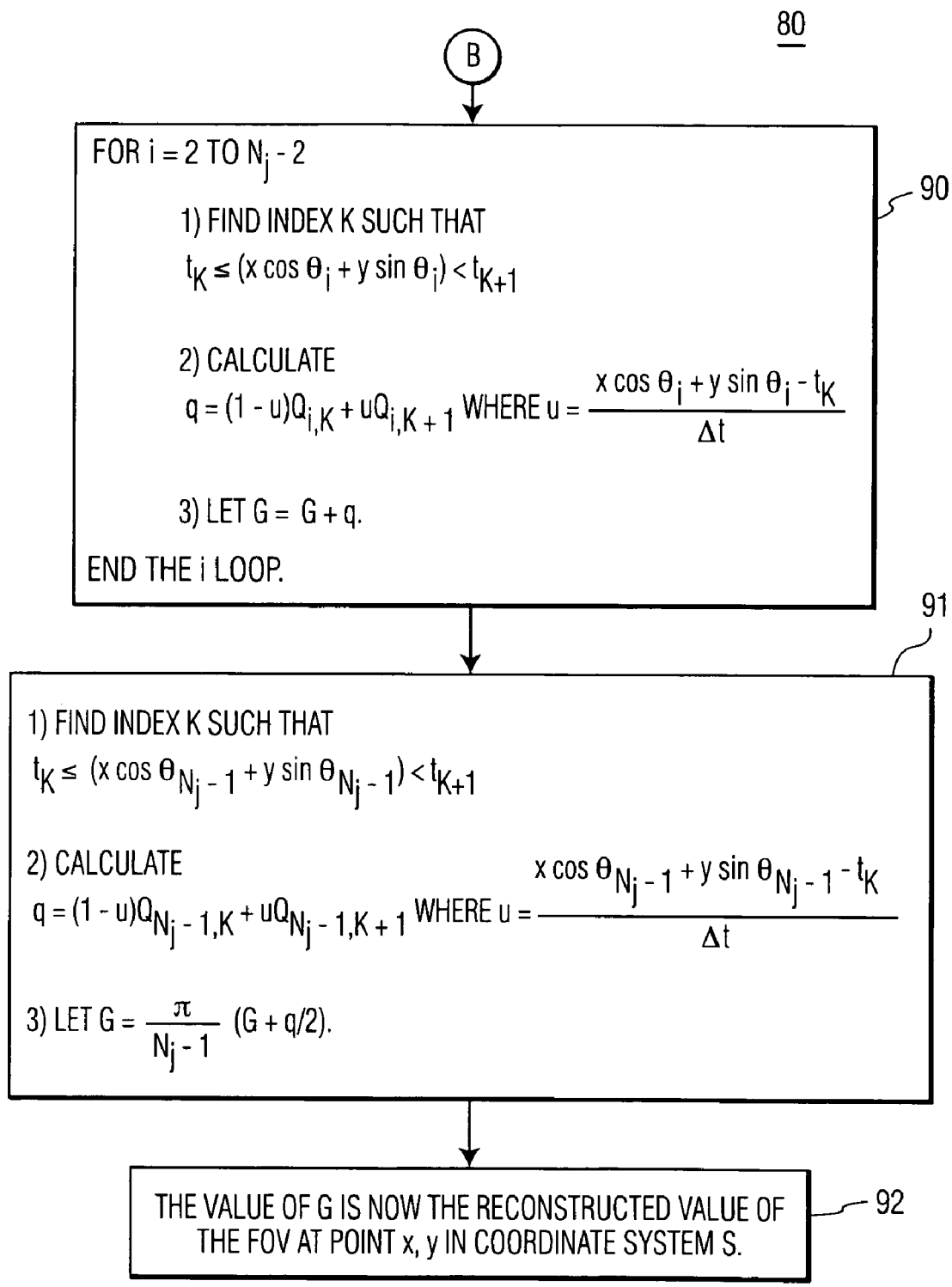

Referring next to FIGS. 7A, 7B and 7C, there is shown another exemplary method of measuring a FOV of an optical sensor, the method generally designated as 80. The method, beginning at step 81, specifies an X,Y coordinate system having an origin located near a center of the field-of-view. The coordinate system is designated as S.

The method, in step 82, specifies evenly spaced angles between 0 radians and pi radians. These evenly spaced angles are separated by $\Delta\theta$. Step 83 of the method specifies evenly spaced distances for moving the slit (or slot) along a specific angle. $\Delta t$ is the separation distance between adjacent slit positions.

After the evenly spaced angles are specified and the evenly spaced distances of the slit are specified, the method in step 84, defines a filtering function designated as $h_k$. As shown in FIG. 7A, $h_k$ takes on different values depending on the value of the integer k. The value of k may be positive or negative, as the distances of the slit (or slot) may be positioned in a positive direction or a negative direction, about a centered origin in coordinate system S.

In step 85, the method provides a light source having a uniform radiance field with a desired spectrum. The spectrum may include a wide range of wavelengths, such as the wide range provided by a black body, or the spectrum may include a narrow or specific wavelength. The uniform radiance preferably covers the FOV of the sensor. Continuing step 85, the method positions the longitudinal slot, having a width of w, in an X,Y plane of the FOV, such that the center of the slot is disposed at a distance $t_k$ from the origin of the coordinate system, at an angle of $\theta_j$ with respect to the X axis.

It will be appreciated that the longitudinal slot is preferably long enough to extend out to a point where the FOV of the optical sensor is zero. After the slot is positioned at this distance and angle, the light passing through the slot is detected by the optical sensor as a signal. The signal detected by the optical sensor is measured and denoted by a value of $P_{j,k}$. The method continues re-positioning the longitudinal slot, at equally spaced distances from the origin of the coordinate system, along the t scanning direction. This re-positioning is repeated for a complete count of the values of k, from k=0 to $N_k-1$. A different value of $P_{j,k}$ is measured for every re-positioning of the slot along a fixed direction. In other words, the j value stays fixed, while the value of k is varied from k=0 to $N_k-1$.

Still continuing the description of step 85, the method re-positions the longitudinal slot for scanning along another direction t at a different angle of $\theta_j$. The angle of $\theta_j$ is changed at evenly spaced angles between 0 radians and pi radians. In performing the outer loop shown in step 85, the method varies the value of j from j=0 to $N_j-1$ until all measurements have been completed, as a function of various angles positioned evenly between 0 radians and pi radians.

The signals detected by the optical sensor are measured in this manner and filtered by the $h_k$ filter, defined in step 84. The step of filtering the detected optical sensor signals is performed, as shown by step 86, to provide a grid of filtered values, each filtered value denoted by $Q_{j,k}$.

Referring next to FIGS. 7B and 7C, the method interpolates among the grid of filtered values to form a two-dimensional map of the FOV. The interpolation is performed by steps 88, 89, 90, 91 and 92.

The interpolation is calculated to find an X,Y value of the FOV in the coordinate system of S. The interpolation is calculated among adjacent points on the grid of filtered values, which have been calculated in step 86. As the adjacent points on the grid have different values of k, the method finds the index k such that the equations shown in steps 89, 90 and 91 are satisfied.

It will be appreciated that the interpolation algorithm performed by method 80 in steps 88, 89, 90, 91 and 92 (FIGS. 7B and 7C) uses equations that are slightly different from the equations used by method 60 in steps 67, 68, 69, 70, 71 and 72 (FIGS. 6B and 6C). Method 80 only interpolates by finding the index k that satisfies the equations executed by steps 89, 90 and 91 (FIGS. 7B and 7C). Method 60, on the other hand, interpolates by finding the index j and index k that satisfies the equations executed by steps 69, 70 and 71 (FIGS. 6B and 6C). Furthermore, the value of v is 1 in steps 89, 90 and 91, making the equations different from the equations executed in steps 69, 70 and 71.

The method is completed by step 72, where each value of G is now the reconstructed (or interpolated) value of the FOV of the optical sensor, at point X,Y in coordinate system S. The algorithm executed by method 80, as exemplified by FIGS. 7A, 7B and 7C, may also be referred to as a non-modified filtered backprojection algorithm.

Figure 8A:
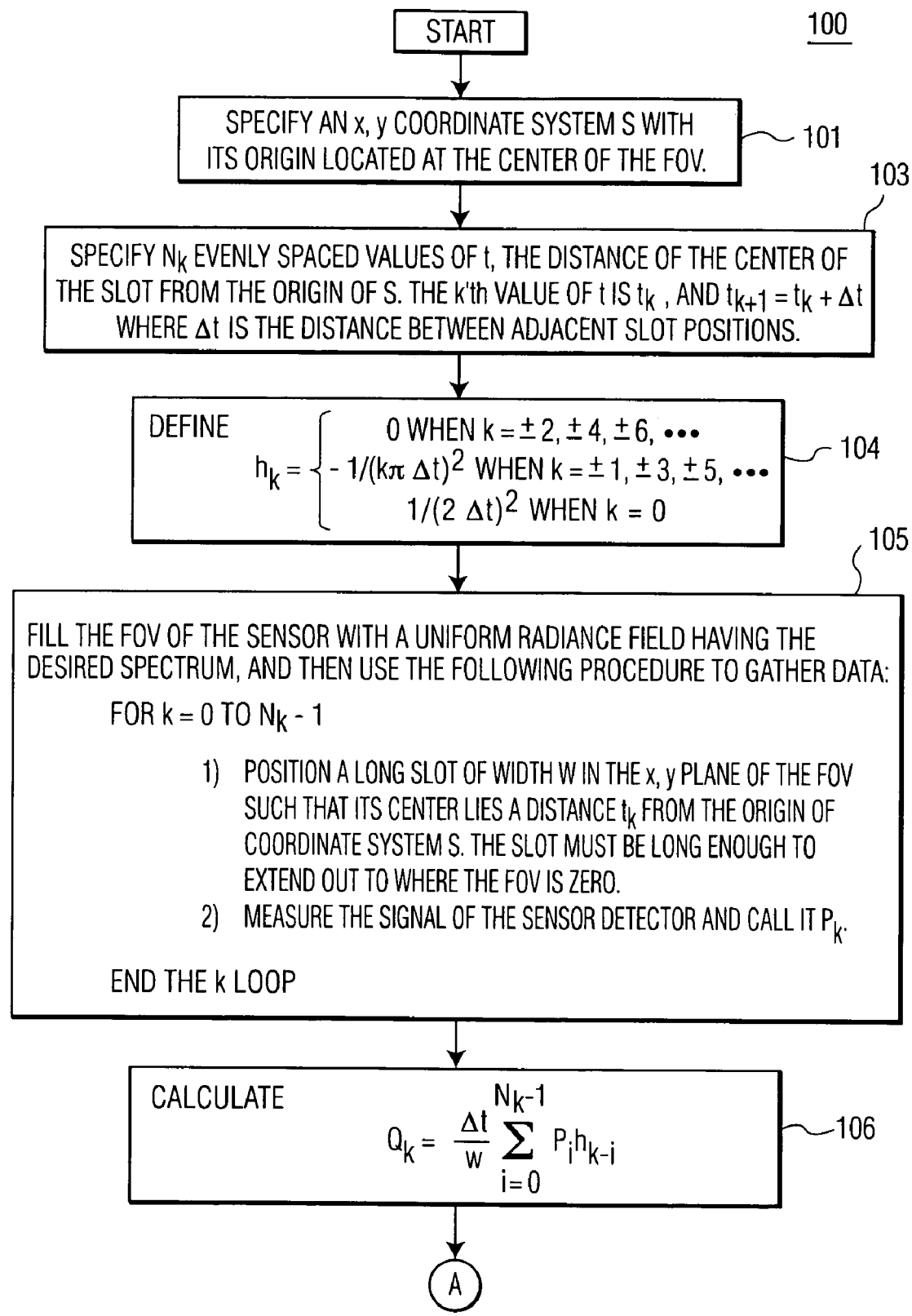
FIGS. 8A, 8B and 8C are flow diagrams of still another embodiment of a method of the invention, utilizing the system of FIG. 1, to measure the FOV of the optical system under test.
Figure 8B:
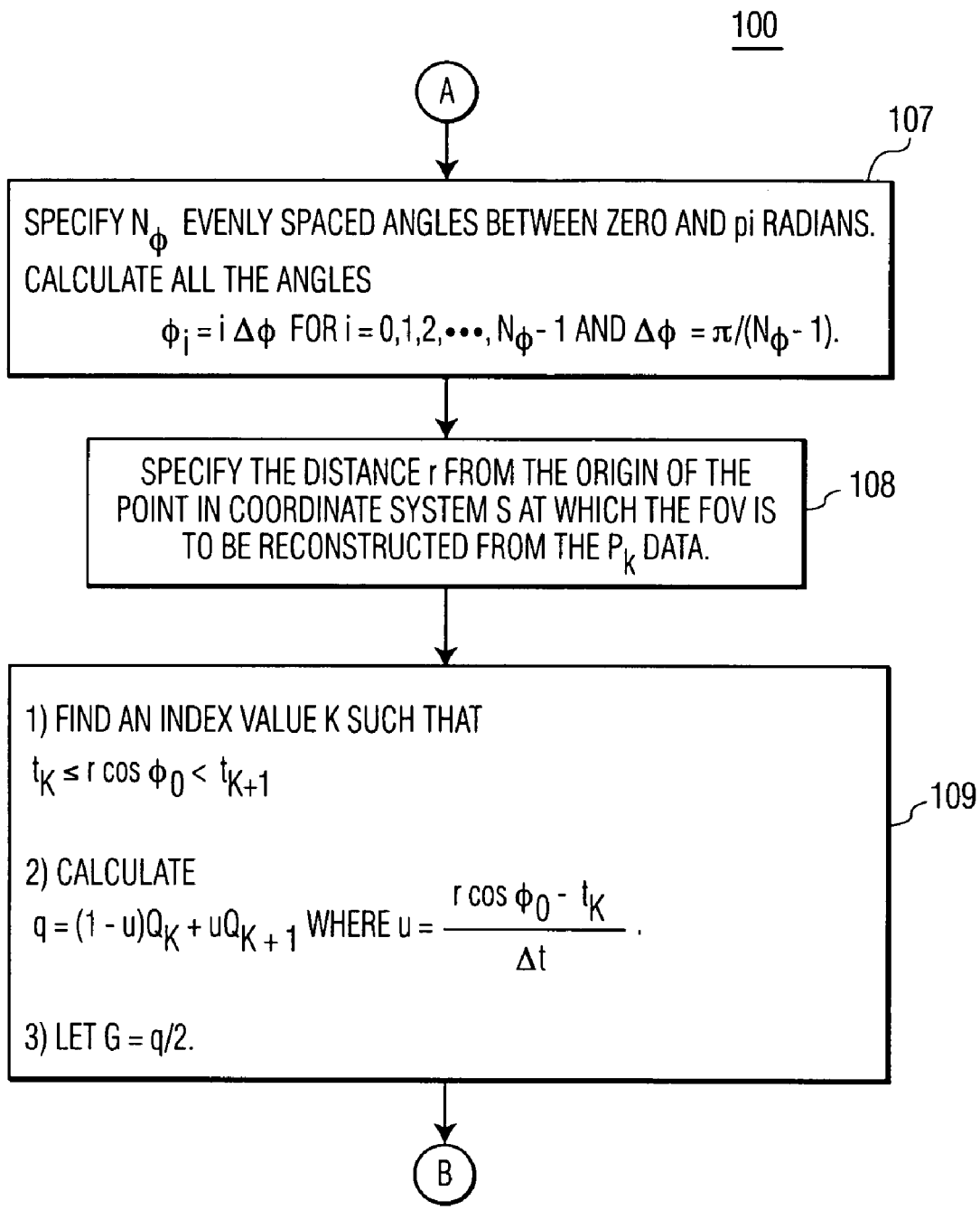
Figure 8C:
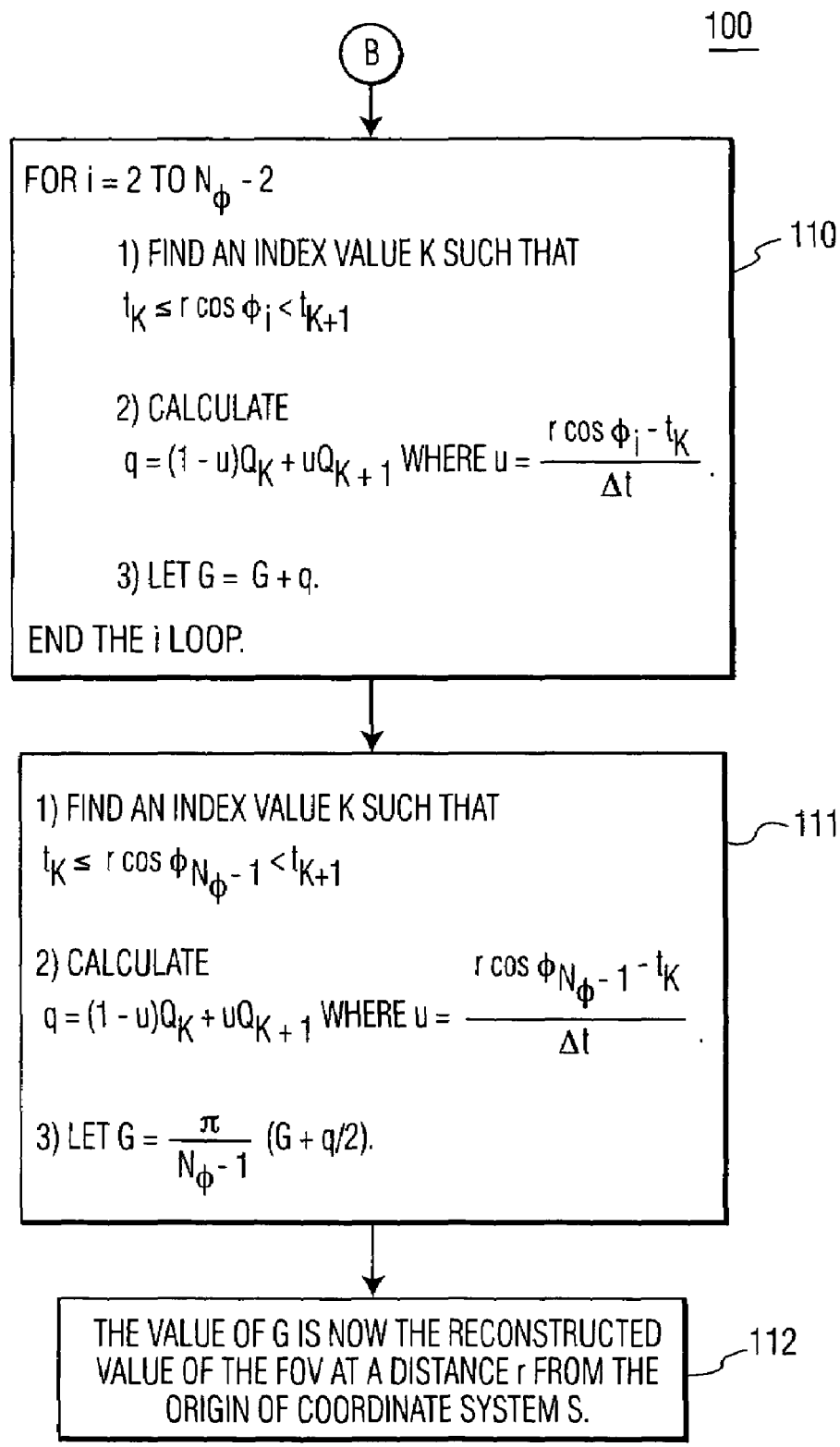

Referring now to FIGS. 8A, 8B and 8C, there is shown yet another exemplary method of measuring a FOV of an optical sensor, the method generally designated as 100. The method, beginning at step 101, specifies an X,Y coordinate system having an origin located near a center of the field-of-view. The coordinate system is designated as S.

The method, in step 103, specifies evenly spaced distances for moving the slit (or slot) along one specific angle only. For example, the angle $\theta$ may be zero. In other words, the slit is moved only in the X direction, at Y=0. $\Delta t$ is the separation distance between adjacent slit positions.

After the evenly spaced distances of the slit are specified, the method in step 104, defines a filtering function designated as $h_k$. As shown in FIG. 8A, $h_k$ takes on different values depending on the value of the integer k. The value of k may be positive or negative, as the distances of the slit (or slot) may be positioned in a positive direction or a negative direction, about a centered origin in coordinate system S.

In step 105, the method provides a light source having a uniform radiance field with a desired spectrum. The spectrum may include a wide range of wavelengths, such as the wide range provided by a black body, or the spectrum may include a narrow or specific wavelength. The uniform radiance preferably covers the FOV of the sensor. Continuing step 105, the method positions the longitudinal slot, having a width of w, in an X,Y plane of the FOV, such that the center of the slot is disposed at a distance $t_k$ from the origin of the coordinate system, at an angle of $\theta_j$ with respect to the X axis ($\theta_j$ may be zero, for example).

It will be appreciated that the longitudinal slot is preferably long enough to extend out to a point where the FOV of the optical sensor is zero. After the slot is positioned at this distance and angle, the light passing through the slot is detected by the optical sensor as a signal. The signal detected by the optical sensor is measured and denoted by a value of $P_k$. The method continues re-positioning the longitudinal slot, at equally spaced distances from the origin of the coordinate system, along the t scanning direction. This re-positioning is repeated for a complete count of the values of k, from k=0 to $N_k$–1. A different value of $P_k$ is measured for every re-positioning of the slot along a fixed scan direction.

Method 100, as embodied in FIGS. 8A, 8B and 8C, is different from methods 60 and 80 in that the slot is only moved in one direction t, at any one selected angle θ (for example, θ may be 0, and t may be x at y=0 in an X,Y plane).

The signals detected by the optical sensor are measured in this manner and filtered by the $h_k$ filter, defined in step 104. The step of filtering the detected optical sensor signals is performed, as shown by step 106, to provide a grid of filtered values, each filtered value denoted by $Q_k$. (Notice that the value of j is fixed).

Referring next to FIGS. 8B and 8C, the method interpolates among the grid of filtered values to form a two-dimensional map of the FOV. The interpolation is performed by steps 107, 108, 109, 110, 111 and 112.

The interpolation is calculated to find an X,Y value of the FOV in the coordinate system of S. The interpolation is performed by using evenly spaced angles between 0 radian and pi radian, where each angle is denoted by $\phi_i$. The interpolation is calculated among adjacent points on the grid of filtered values, which have been calculated in step 106. As the adjacent points on the grid have different values of k, step 69 finds the index k such that the equations shown in steps 109, 110 and 111 are satisfied. It will be appreciated that the interpolation, as specified by step 108 uses the distance, r, from the origin of the point in coordinate system S, at which the FOV is to be reconstructed from the $P_k$ values.

The method is completed by step 112, where each value of G is now the reconstructed (or interpolated) value of the FOV of the optical sensor, at a distance, r, from the origin of coordinate system S. The algorithm executed by method 100, as exemplified by FIGS. 8A, 8B and 8C, may also be referred to as a circularly symmetric filtered backprojection algorithm. Method 100 may be used to construct the FOV of an optical sensor known to have a circularly symmetric response to light.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of measuring a field-of-view (FOV) of an optical sensor comprising the steps of:
   (a) uniformly illuminating a FOV of the optical sensor;
   (b) moving, at an angle of motion, a slit across the FOV and illuminating the optical sensor through the slit;
   (c) measuring an optical response of the sensor through the slit, at evenly spaced positions of the moving slit;
   (d) changing the angle of motion and repeating steps (b) and (c);
   (e) repeating step (d) for equally spaced angles of motion; and
   (f) constructing a two-dimensional map of the FOV of the optical sensor, after completing step (e);
   wherein the slit includes a longitudinal dimension greater than a span length across the FOV of the optical sensor.

2. The method of claim 1 wherein constructing the two-dimensional map of the FOV includes filtering measured data obtained in step (e) using a filtered backprojection algorithm, and
   interpolating among the filtered measured data to form the two-dimensional map of the FOV.

3. The method of claim 1 wherein constructing the two-dimensional map of the FOV includes
   forming a grid of values corresponding to the measured optical response of the sensor at the evenly spaced positions of the moving slit and the equally spaced angles of motion, and
   interpolating on the grid to find a value of the FOV at a point on the optical sensor.

4. The method of claim 3 wherein interpolating on the grid includes
   estimating the value of the FOV at the point given by coordinates x, y using adjacent values formed on the grid.

5. The method of claim 3 wherein interpolating on the grid includes
   estimating the value of the FOV at the point given by coordinates x, y, using adjacent values formed on the grid, as a function of evenly spaced angles between zero radians and pi radians.

6. The method of claim 1 wherein
   moving the slit across the FOV includes positioning the slit in an X,Y plane of the FOV of the optical sensor, wherein a center of the slit is disposed at a distance $t_k$ along a t direction from an origin of an X,Y,Z coordinate system, and the t direction is oriented at an angle $\theta_j$ with respect to the X-axis of the coordinate system;
   measuring the optical response of the sensor includes measuring a detected signal of the sensor as a value of $P_{j,k}$ where a j'th angle is $\theta_j$ and a k'th value of the t direction is $t_k$; and
   constructing the two-dimensional map of the FOV includes filtering the optical response of the sensor by multiplying a weighting function $h_k$ with the value of $P_{j,k}$ to form a quantity of $Q_{j,k}$.

7. The method of claim 6 wherein filtering the optical response of the sensor includes
   forming a grid of values at different integer values of j and k, wherein each grid value is $$Q_{j,k} = \frac{\Delta t}{w} \sum_{i=0}^{N_k-1} P_{j,i} h_{k-i}$$

where:
$\Delta t$ is a distance along the t direction between adjacent slit positions,
w is a width of the slit,
$N_j$ is an evenly spaced angle between zero radians and pi radians, the j'th angle is $\theta_j$, and $\theta_{j+1}=\theta_j+\Delta\theta$, where $\Delta\theta$ is the separation of adjacent angles,
$N_k$ is an evenly spaced value of t, where t is a distance of the slit from the origin of the coordinate system, and the k'th value of t is $t_k$ and $t_{k+1}=t_k+\Delta t$, where $\Delta t$ is the distance between adjacent slot positions.

8. The method of claim 7 wherein the weighting function $h_k$ is $$h_k = \begin{cases} 0 & \text{when } k = \pm 2, \pm 4, \pm 6, \ldots \\ -1/(k\pi\Delta t)^2 & \text{when } k = \pm 1, \pm 3, \pm 5, \ldots \\ 1/(2\Delta t)^2 & \text{when } k = 0. \end{cases}$$

9. The method of claim 7 wherein
after forming the grid of values, the method includes the following step:
interpolating among adjacent values of the grid of values to determine a value of the FOV at a point given by coordinates x,y and defined by f(x,y), as follows:

$$f(x, y) = \frac{\pi}{N_\phi - 1} \sum_{i=1}^{N_\phi-2} q(\phi_i, x\cos(\phi_i) + y\sin(\phi_i)) +$$

$$\frac{1}{2}\frac{\pi}{N_\phi - 1}\left[q(\phi_0, x\cos(\phi_0) + y\sin(\phi_0)) + q(\phi_{N_\phi-1}, x\cos(\phi_{N_\phi-1}) + y\sin(\phi_{N_\phi-1}))\right]$$

where:
$\Delta\phi=\pi/(N_\phi-1)$ in radians
$N_\phi$ is an angle in radians specified by $\phi i=i\Delta\phi$ for i=0,1, 2, ... $N_\phi-1$
$t_k \leq t < t_{k+1}$
$\theta_j \leq \phi < \theta_{j+1}$
$q(\phi,t)=(1-v)(1-u)Q_{j,k}+v(1-u)Q_{j+1,k}+vuQ_{j+1,k+1}+(1-v)uQ_{j,k+1}$ $$v = \frac{\phi - \theta_j}{\theta_{j+1} - \theta_j} = \frac{\phi - \theta_j}{\Delta\theta} \text{ and } u = \frac{t - t_k}{t_{k+1} - t_k} = \frac{t - t_k}{\Delta t}.$$

10. The method of claim 1 wherein the slit includes a width dimension of approximately equal to one percent of a span length across the FOV of the optical sensor.

11. A method of measuring a field-of-view (FOV) of an optical sensor having circular symmetry, the method comprising the steps of:
(a) uniformly illuminating a FOV of the optical sensor;
(b) moving a slit across the FOV and illuminating the optical sensor through the slit;
(c) measuring an optical response of the sensor through the slit, at evenly spaced positions across the FOV; and
(d) constructing a two-dimensional map of the FOV of the optical sensor, after completing step (c);
wherein the slit includes a longitudinal dimension greater than a span length across the FOV of the optical sensor.

12. The method of claim 11 wherein
step (b) includes moving the slit across the FOV in a single direction only.

13. The method of claim 12 wherein constructing the two-dimensional map of the FOV includes
forming a grid of values corresponding to the measured optical response of the sensor at the evenly spaced positions along the single direction, and
interpolating on the grid to find a value of the FOV at a point on the optical sensor.

14. The method of claim 13 wherein interpolating on the grid includes
estimating the value of the FOV at the point given by coordinates x, y using adjacent values formed on the grid.

15. The method of claim 13 wherein interpolating on the grid includes
estimating the value of the FOV at the point given by a distance r from the origin of coordinates x, y, using adjacent values formed on the grid, as a function of evenly spaced angles between zero radians and pi radians.

16. The method of claim 11 wherein
moving the slit across the FOV includes positioning the slit in an X,Y plane of the FOV of the optical sensor, wherein a center of the slit is disposed at a distance $t_k$ along a t direction from an origin of an X,Y,Z coordinate system;
measuring the optical response of the sensor includes measuring a detected signal of the sensor as a value of $P_k$, where a k'th value of the t direction is $t_k$; and
constructing the two-dimensional map of the FOV includes filtering the optical response of the sensor by multiplying a weighting function $h_k$ with the value of $P_k$ to form a quantity of $Q_k$.

17. The method of claim 16 wherein filtering the optical response of the sensor includes
forming a grid of values at different integer values of k, wherein each grid value is $$Q_k = \frac{\Delta t}{w} \sum_{i=0}^{N_k-1} P_i h_{k-i}$$

where:
$\Delta t$ is a distance along the t direction between adjacent slit positions,
w is a width of the slit,
$N_k$ is an evenly spaced value of t, where t is a distance of the slit from the origin of the coordinate system, and the k'th value of t is $t_k$ and $t_{k+1}=t_k+\Delta t$, where $\Delta t$ is the distance between adjacent slot positions.

18. The method of claim 16 wherein the weighting function $h_k$ is $$h_k = \begin{cases} 0 & \text{when } k = \pm 2, \pm 4, \pm 6, \ldots \\ -1/(k\pi\Delta t)^2 & \text{when } k = \pm 1, \pm 3, \pm 5, \ldots \\ 1/(2\Delta t)^2 & \text{when } k = 0. \end{cases}$$

* * * * *